W. I. CHASE.
Twine-Holders.
No. 149,720. Patented April 14, 1874.
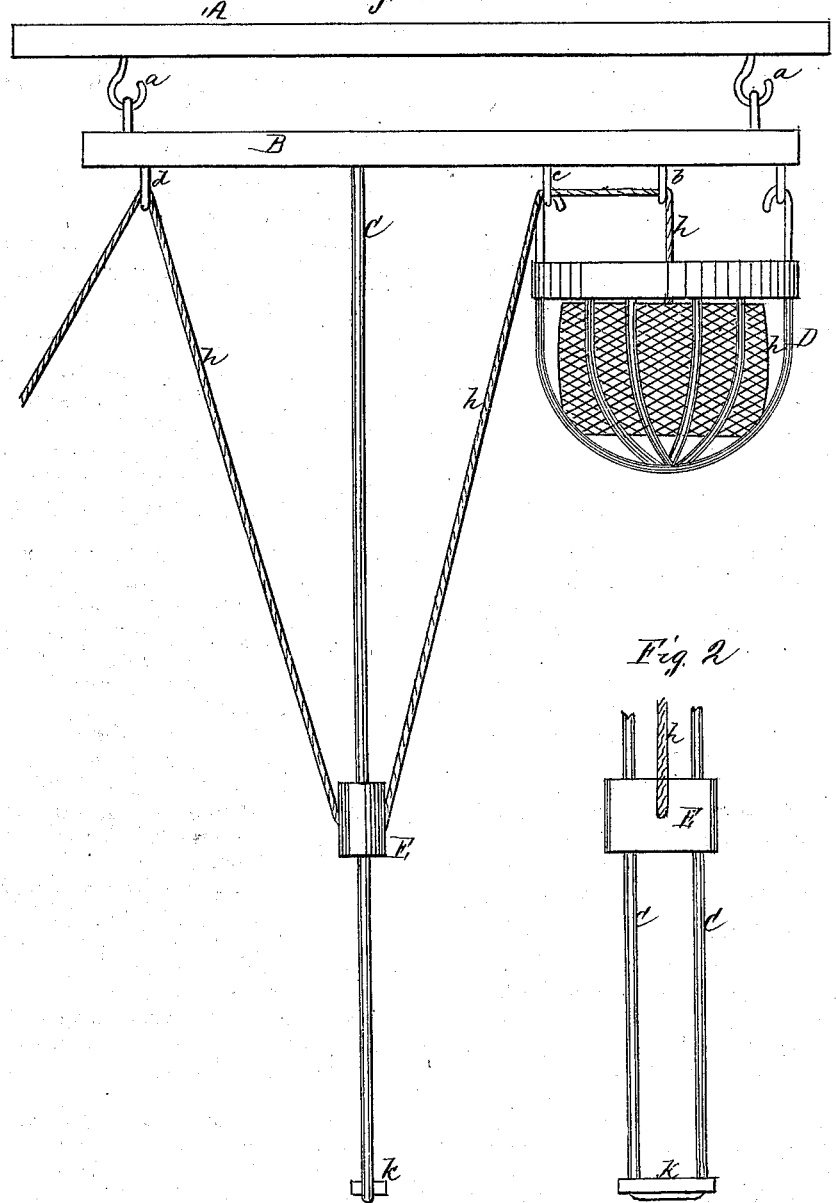

UNITED STATES PATENT OFFICE.

WILLIAM I. CHASE, OF DOVER, NEW HAMPSHIRE.

IMPROVEMENT IN TWINE-HOLDERS.

Specification forming part of Letters Patent No. 149,720, dated April 14, 1874; application filed February 12, 1874.

*To all whom it may concern:*

Be it known that I, WILLIAM I. CHASE, of Dover, in the county of Strafford, State of New Hampshire, have invented a certain new and useful Improvement in Twine-Holders, of which the following is a description sufficiently full, clear, and exact to enable any person skilled in the art or science to which my invention appertains to make and use the same, reference being had to the accompanying drawing forming a part of this specification, in which—

Figure 1 is a side elevation of my improved twine-holder. Fig. 2 is a sectional view of the drop mechanism or take-up.

Like letters refer to like parts in the different figures of the drawing.

My invention relates more especially to that class of twine-holders which are suspended from the ceiling or above the point where the twine is used; and consists in the use of a drop sliding on parallel rods, in combination with the twine basket or holder, for the purpose of exerting a tension upon the twine and taking up or withdrawing the loose end, as hereinafter more fully set forth and claimed.

The extreme simplicity of my invention renders an elaborate description unnecessary. In Fig. 1, A represents the ceiling, to which the horizontal bar B is attached by the hooks and eyes *a a*. A basket or receptacle, D, for holding the ball of twine *h* is suspended from one end of the bar by hooks, so as to be readily removed. Projecting from the lower side of the bar, near its center, there are also two vertical rods, C C, Fig. 2, connected at their lower ends and provided with the stop *k*. Arranged to slide freely upon these rods there is a weight or take-up, E, through which there is a lateral aperture for the cord or twine *h h*. An eye or guide, *b*, is attached to the under side of the bar B, centrally over the basket D, and there are also two other twine guides or eyes, *c d*, attached to the same side of said bar, as shown.

From the foregoing description the nature and operation of my invention will be readily understood by all conversant with such matters. A ball of twine being placed in the basket D the end is carried through the guides *b c*, then down through the take-up E, and lastly through the guide *d*.

It is well known to merchants and others who have occasion to use twine from the ordinary holder suspended as described that much more twine is usually pulled from the ball in the hurry of business than is required for actual use, the loose end which is thus left lying on the counter causing great annoyance and trouble and resulting in waste. This difficulty is entirely obviated by my invention, the slide or take-up E acting by gravitation to withdraw or raise the loose end of the twine from the counter when the twine is cut, and also acting to prevent the sudden or accidental unwinding or pulling off of more twine from the ball than is required.

I am aware that a twine-holder has been made in which a gravitating ring is used sliding on a single central rod, and through which ring a loop of the twine passes; but the objection to such an arrangement is that the twine is liable to be twisted and caught between the ring and central rod by the partial rotary movements of the ring, thus producing an unequal tension and liability to breakage; whereas, in my improved holder, by the use of the two rods C C the tension weight or slide E is always kept in the same relative position, permitting the twine to pass through it easily and without twisting or breaking.

What I claim is—

In a twine-holder, the parallel vertical rods C C, provided with the gravitating tension weight or slide E, having an aperture through which the twine passes, arranged and operating as and for the purpose specified.

WILLIAM I. CHASE.

Witnesses:
J. W. HENDERSON,
JAMES F. CHASE.